PHOTOELECTRIC SIGNAL CONTROL WITH POWER KEYBOARD ACTUATED CODE DISCS

Filed Feb. 7, 1964

INVENTORS
JAMES W. DODSWORTH
LUDWIG J. KAPP
BY Elmer W. Edwards
AGENT

INVENTORS
JAMES W. DODSWORTH
LUDWIG J. KAPP
BY [signature]
AGENT

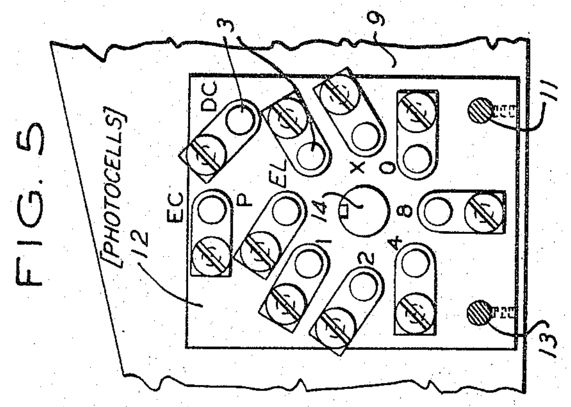
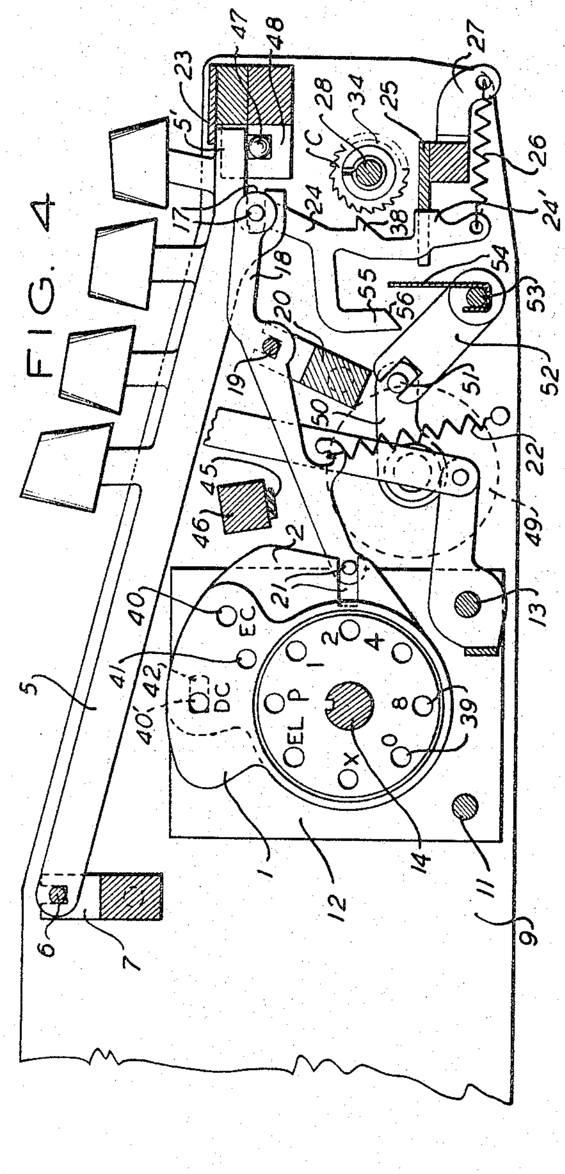
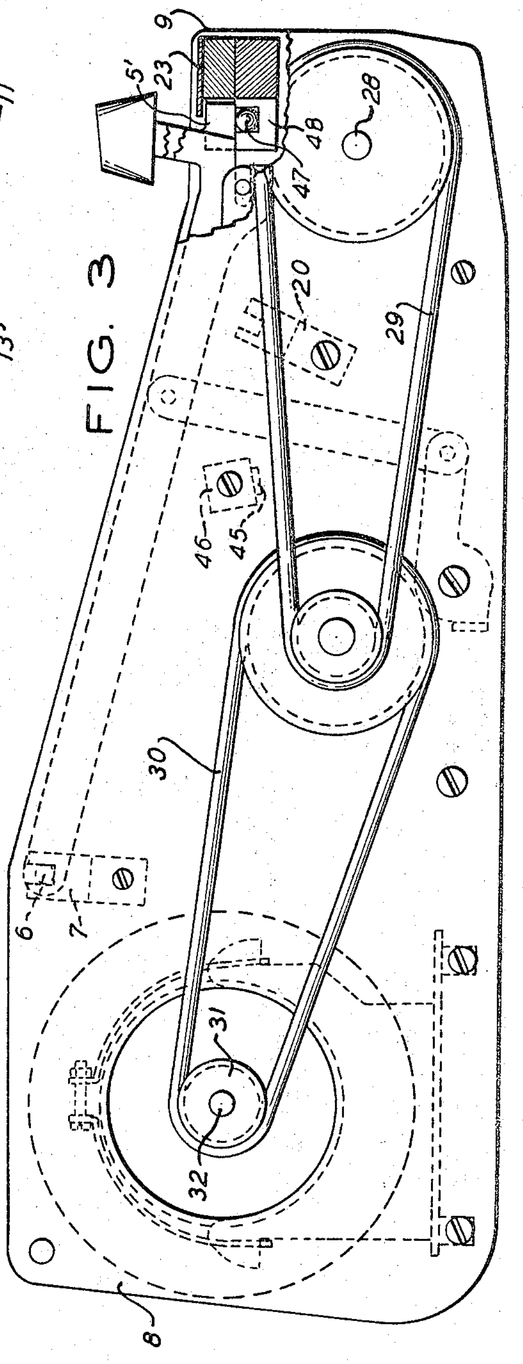
INVENTORS
JAMES W. DODSWORTH
LUDWIG J. KAPP
BY Elmer W. Edwards
AGENT INVENTORS
JAMES W. DODSWORTH
LUDWIG J. KAPP
BY Elmer W. Edwards
AGENT INVENTORS
JAMES W. DODSWORTH
LUDWIG J. KAPP
BY Elmer W. Edwards
AGENT INVENTORS
JAMES W. DODSWORTH
LUDWIG J. KAPP
BY [signature]
AGENT

United States Patent Office 3,334,237

Patented Aug. 1, 1967

3,334,237
PHOTOELECTRIC SIGNAL CONTROL WITH POWER KEYBOARD ACTUATED CODE DISCS

James W. Dodsworth, Mount Tabor, and Ludwig J. Kapp, Cedar Grove, N.J., assignors to Monroe International Inc., a corporation of New York Filed Feb. 7, 1964, Ser. No. 343,385
19 Claims. (Cl. 250—219)

This invention relates to a keyboard apparatus in which, for uniform and easy operation, the individual keys are manually selected by partial depression and immediately are operated by respective power trains. Each train is adapted for setting therewith novel related permutation devices which include masking discs for controlling coded photoelectric parallel output signals in accordance with the particular key selected.

It is desirable that the keyboard will have the same touch and easy key action to which operators are accustomed in operating the usual well-known mechanical type keyboards. At the same time, despite the considerable number of keys now used on data-processing machines, it is also desirable that the keyboard width be not increased by the requirements of such permutation devices and their corresponding power trains.

To assure a proper control of the permutation devices by their respective key it is imperative that any key once selected must be fully operated and maintained so operated by its respective power train until any receiving equipment controlled thereby completes its functions and has signaled back it is now receptive to further signals.

Also, to permit a rapid adjustment of the permutation devices the selected power train will act herein to prevent unwanted rebound of any permutation disc at the completion of its setting operation.

An object of the present invention therefore provides for keyboard power key stroke devices which include an individual slip drive clutch associated with each key provided, each said clutch selectively engageable for completing by power the operation of any selected key upon a partial manual operation of the corresponding key.

As another object the invention provides in a keyboard, power keystroke means including a power shaft having supported thereon a series of adjacent operating members each independently yieldably driven and related to a corresponding control key for selective operation, whereby in an initial key movement to individually complete an active control stroke of the related selected key.

As a further object the yieldably driven independent operating means will act to maintain the related selected active key in an operated condition as the power shaft continues in operation.

As another object the invention includes novel code photoelectric permutation means comprising for each key provided a movable masking member selectively settable to a uniform position by the said independent operating means incident to a power operation of a keystroke, whereby to interrupt one or more of a plurality of light beams determining a parallel series of coded intelligence in accordance with any given selected key.

Another object of the invention is the provision of universal means for effecting a rapid restoration of any active key independently of engagement with any other key.

Further objects and advantages of the invention will be apparent from the following detailed description, taken in connection with the accompanying drawings showing one illustrative embodiment of the invention, in which:

FIG. 3 is an elevational view showing the side of the device of FIG. 2 along the line 3—3.

FIG. 4 is a cross sectional view taken substantially along the line 4—4 of FIG. 2 and showing the parts in normal condition of rest.

FIG. 5 is a detail elevation of the photocells arranged on the support plate therefor.

Figure 1:
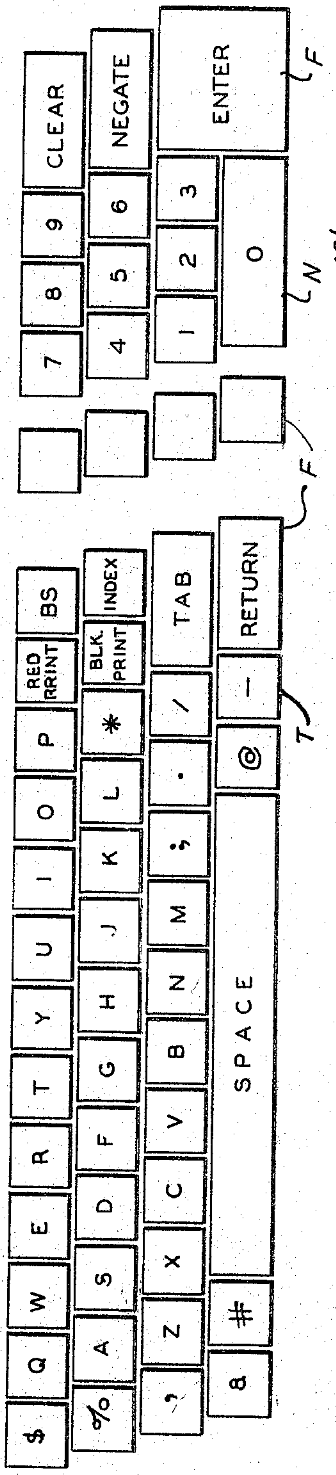
FIG. 1 is a diagrammatic plan view of an alphanumeric keyboard provided in accordance with the invention.
Figure 7:
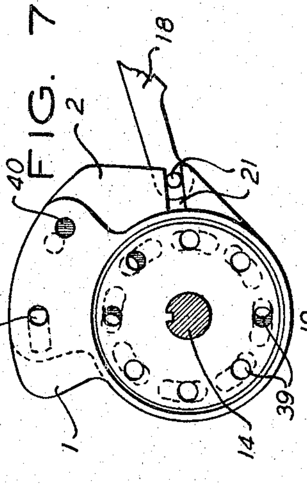
FIG. 7 is a detail elevation showing a code permutation disc in a partially operated position.

Referring to FIG. 1, the invention is shown in relation to a dual type keyboard, in which alphabetical or typewriter keys T are grouped to the left while on the right thereof numerical keys N are grouped in the manner usually associated with well-known ten key adders. In addition to the alphabetic portion and the numeric portion separate control sections may be provided for any special function keys F. However, in the instant case there are no usual printing or register devices provided within the keyboard casing. In lieu thereof each of the keys of the keyboard have associated therewith a pair of masking discs 1, 2 (FIG. 4) adapted to be adjusted one relative to the other whereby to differentially interrupt one or more of a plurality of parallel light beams which control the operation of the like number of photocells 3 (FIG. 5) there being a lamp 4 (FIG. 2) and photocell 3 for each point of the code being handled. Also each of the keys on the keyboard together with their analogous permutation code device is adapted to be adjusted by individual power means, as selectively initiated in response to a manual selection of a corresponding one of said keys, in the manner hereinafter to be described.

The keys of the keyboard are each pivotally supported, by means of a rearwardly extending arm 5 thereof, upon a transverse rod 6. Each key is spaced laterally thereon by means of a suitable comb bar 7, secured with rod 6 within the left and right side framing 8, 9 of the machine.

Within said framing 8, 9 is suspended also a code permutation device including an easily removable compact unit comprising end support plates 10 and 12 supported upon the rods 11 and 13 mounted within the left and right side frames 8, 9. First within plates 10, 12 and extending across the arms 5 for the keys is a fixed splined shaft 14 upon which is supported in associated pairs a plurality of the code permutation discs 1, 2 (FIG. 8–12). Each of the discs 1 is adapted to be slidably mounted upon shaft 14 and has a key 15 thereon engageable with said splined shaft, so that each of said discs 1 is secured against rotation. Discs 1 are each provided with a rightwardly extending hub 16 upon which is loosely mounted the corresponding disc 2.

Each of the arms 5 (FIG. 4) of the operating keys has pin and open end slot connection 17 with the forward end of a corresponding lever 18, pivotally mounted upon a transverse rod 19 and held suitably spaced thereon by means of a comb bar 20 secured within the left and right side frames 8, 9. The rearward end of each of the levers 18 has pin and open end slot connection 21 with a corresponding one of the discs 2. A suitable spring 22 for each of the levers 18 serves to hold the respective levers in a counterclockwise position, so that arms 5 with their associated keys are held thereby in raised position, against an upstop plate 23 extending across the forward end of the keyboard.

Pivotally supported upon each of the pins 17 is a downwardly extending pawl 24, held biased for counterclockwise operation and against a fixed transverse plate 25 by individual springs 26, secured to the lower end of said pawls and to related arms 27 of the plate 25. Extending transversely of the pawls 24 is a power shaft 28 suitably bearing within side frames 8, 9 and connected by drive belts 29, 30 (FIG. 3) with a pulley wheel 31 fast upon motor shaft 32 for continuous operation therewith.

Mounted in adjacent manner upon power shaft 28 are individual power clutch units designated by the letter C, there being a plurality of such clutch units provided, sufficient for accommodating the maximum number of keys to which the keyboard is designed, and each unit being of similar construction as follows.

A coil spring 33 (FIG. 15) is mounted upon shaft 28 and is wound in a manner for frictional counterclockwise operation therewith.

Spring 33 has loosely mounted thereon a ratchet toothed wheel 34 provided with a hub 35 having a notch 36 therein. The left side of spring 33 terminates in an upturned end 37 adapted when wheel 34 is mounted upon said spring to engage with notch 36 of hub 35. Thus it will be obvious that upon a counterclockwise operation of power shaft 28 all of the clutch units C are frictionally driven therewith through the medium of the respective springs 33.

Pawls 24 (FIG. 4) depended from the respective keys of the keyboard are each provided with a projection 38 in plane with the teeth of the corresponding ones of the ratchet wheels 34, said projection being held rearwardly out of cooperation with ratchet wheels 34 by virtue of the earlier described engagement of pawl 24 with the transverse plate 25.

In the usual manual key touch operation any selected key is caused to be depressed sufficiently whereby to carry the corresponding pawl 24 downwardly therewith and free of the plate 25, whereupon its spring 26 will rock the pawl counterclockwise bringing projection 38 thereof into engagement with the related rotating wheel 34. Upon such engagement pawl 24 is thereby carried downwardly and will thus complete a depression of the key and impart also a clockwise operation to the related lever 18. It will be recalled that levers 18 each have pin and slot connection 21 with a corresponding movable disc 2 constituting one of a pair of masking discs 1, 2 associated with each of the respective keys of the keyboard. Said discs are adapted to effect a permutation of the intelligence as represented by any selected key into corresponding coded parallel photoelectric signals, and which will now be more fully described.

All of the discs 1, held in fixed position upon splined shaft 14 as earlier described, are constructed exactly alike and include therein a series of eight equally spaced orifices 39 arranged in a concentric circle around shaft 14. Said orifices relate to an eight bit code to which may be applied as one instance the designations 1, 2, 4, 8, 0, X, EL, and P, as shown in FIG. 4, the same being merely illustrative since other code designations may be substituted in accordance with the particular applications of work desired. In addition to the above orifices 39 each disc 1 is provided with a pair of similar size orifices 40, 40' which are arranged concentric to shaft 14 on an arc of greater radius to that for the orifices 39 and being designated EC and DC signifying "early common" and "delayed common" respectively. Further, each disc 1 is provided with an orifice 41 interspaced on an intermediate length radius to that for the orifices 39, 40, 40' as shown.

Figures 2, 8, 15:
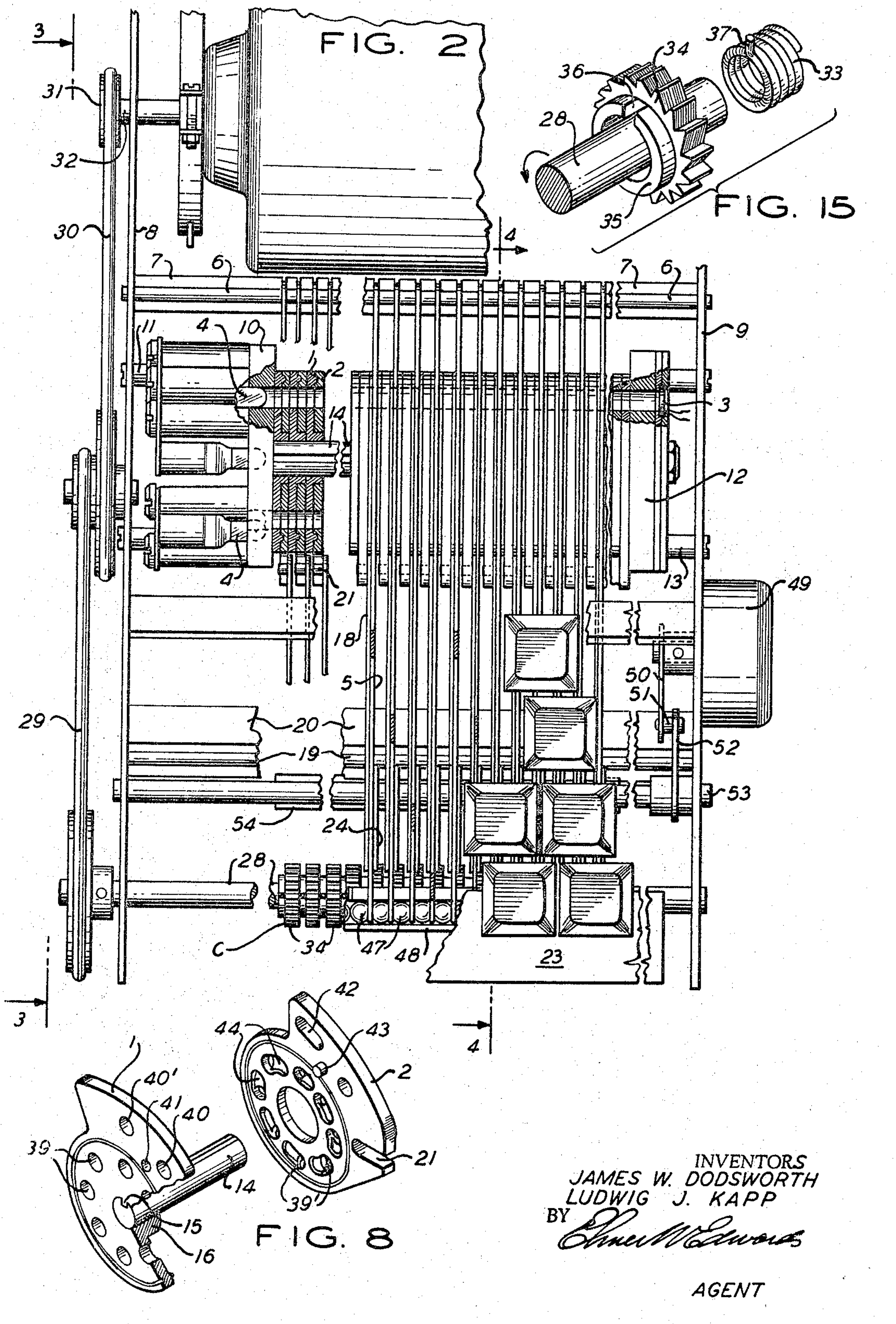
FIG. 2 is a fragmentary top plan view of a portion of the keyboard, with parts broken away.
FIG. 8 is a detail perspective view of a pair of code permutation members serving merely as spacers and not associated with any key of the keyboard.
FIG. 15 is a detail perspective showing one of the individual friction drive clutch means for power operating a corresponding key.

Each of the cooperating movable masking discs 2, as illustrated in FIG. 8, is made normally with matching orifices 39', which in the normal assembled position thereof are in adjacent alignment to the corresponding orifices 39 of discs 1. Each of the discs 2, however, is provided with a slotted opening 42 for cooperation with the "delayed common" orifice 40'. Also, each disc 2 normally includes a leftwardly extending circular knockout protrusion 43 which when said disc is mounted upon hub 16 of disc 1 will act to engage orifice 41 and lock disc 2 therewith against rotation; it being recalled that each disc 1 is held against rotation by the engagement of a key 15 thereof with splined shaft 14. It is also contemplated that in the construction of disc 2 each of the orifices 39' normally appear as one end of a slotted recess providing a thin knockout web portion 44 trailing in a concentric arc clockwise of each said orifice, as viewed in FIG. 8.

As earlier set forth the pairs of discs 1, 2 are supported upon shaft 14 stacked in an adjacent manner. Thus in the normal clockwise condition of discs 2 all the orifices of discs 1, 2, with exception of locking orifice 41, combine to form a plurality of open tunnels. Said tunnels serve to transmit spacial light from suitable lamps 4, supported within corresponding orifices of the left end support plate 10, to corresponding photoelectric tubes 3 mounted within the right side support plate 12 of the permutation unit, earlier described.

It is contemplated that with respect to any intelligence represented upon any of the keys of the keyboard the web portions of the corresponding discs 2 may be readily manually knocked out in representation of coded intelligence, as by the instant eight bit binary code system, in accordance with each key. At the same time protrusion 43 may also be manually punched free, whereby to permit the rotation of disc 2 with respect to disc 1.

Where no key is provided relative to a pair of discs 1, 2, however, said pairs of discs remain as originally constructed to serve as spare spacers in locked open stationary condition.

Thereafter if at any time it should be desired to add new keys or to change the intelligence represented by any key it is but a simple matter in servicing to remove suitable end screws from tie rods 11 and 13, permitting the permutation unit to be dropped bodily from the machine. Thereafter any of the spare discs 2 on shaft 14 are readily removed and adapted to be punched on the job in accordance with a new intelligence of added keys, or substituted for any original ones of the discs 2 and any removed original discs 2 reassembled again upon shaft 14 at any place from which a disc 2 may have been withdrawn.

As hereinbefore described any keys of the keyboard may be connected to a corresponding one of the masking discs 2 by means of suitable pivoted levers 18 which upon selection of any key is rocked by individual friction power clutch means C, in the manner earlier set forth, to adjust the related disc 2 from a normal clockwise position to a counterclockwise set position. It may be noted at this time that in such operation any active arm 18 is brought against a suitable stop pad 45 secured to a transverse bar 46 fast within the side framing of the machine. Also it will be noted that shaft 28 for clutch C continues in operation so that friction clutch spring 33 continues to urge ratchet tooth wheel 34 for yieldable rotation whereby to maintain the selected masking disc 2 in counterclockwise condition and against rebound of the parts.

Since the keyboard of the present invention is adapted for the control of various slave equipment, such as tape or card perforators, or computers with registers and printers which require special operations as for totals, subtotals, carriage shifting, etc., involving different time factors of operation it is necessary that the keyboard be limited to an operation of a single key at any one time and that signals as transmitted by any selected photocells 3 in accordance therewith must be held effective until the receiving equipment completes its operation and is free to again receive further signals.

To assure that a single key only may be operated at any one time well-known ball interlock means are provided, in which a series of balls 47 are confined within a suitable raceway 48 with sufficient tolerance for only allowing end 5′ of any single lever 5 at one time to be depressed between any pair thereof.

As above described any active masking disc 2 is held in counterclockwise adjusted condition by the engagement of a projection 38 of the pawl 24 with ratchet tooth wheel 34 of the related friction clutch means C. Upon completion of an operation of any controlled or slave equipment to which the invention may be applied such equipment is intended to effect in any suitable manner a feed-back pulse to a rotary magnet 49 secured to the keyboard side frame 9.

Figure 16:
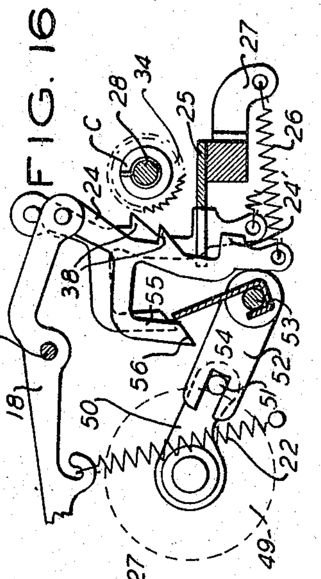
FIG. 16 is a detail right side elevation view showing the restoring means for the permutation masking disc in operated condition.
Figure 6:
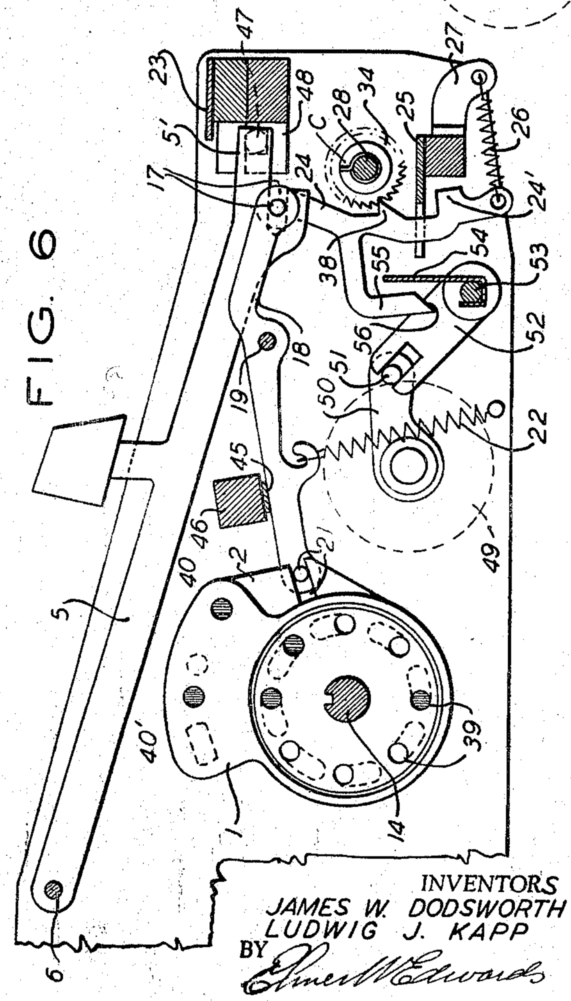
FIG. 6 is a view similar to that of FIG. 4 but showing a key and associated code permutation disc in fully operated condition.

Magnet 49 has secured to the armature thereof a forwardly extending arm 50 having pin and open end slot connection 51 with an upwardly extending arm 52 fast to a transverse shaft 53, pivotally mounted within side frames 8, 9, as shown in FIG. 2. Fast upon shaft 53 is a rock frame 54 (see also FIG. 4) extending across rearwardly extending arms 55 for all of the pawls 24. Thus upon energization of magnet 49 shaft 53 and frame 54, through means of arm 52 pin and slot connection 51 and arm 50, will be rocked in a counterclockwise direction from the position shown in FIGS. 4, 6 to that as illustrated in FIG. 16. During said operation frame 54 will engage any depressed arm 55, rocking the active pawl 24 rearwardly for disengaging projection 38 thereof from the related ratchet wheel 34 while also displacing the tooth 24′ thereof from beneath plate 25. In connection with the latter it will be noted that so long as tooth 24′ is beneath plate 25 it serves to prevent an unwarranted manual lifting of any active key.

Upon release of tooth 24′ from plate 25 operated pawl 24 is restored upwardly along with restoration of lever 18 and the associated masking disc 2, under influence of the related spring 22 and assisted also by the engagement of frame 54 with a cam surface 56 of the active pawl 24. It will also be noted that during said upward movement of pawl 24 arm 55 thereof is lifted free of the frame 54 sufficiently so that in any operations of said frame for restoring any given pawl 24 frame 54 passes inactively beneath the lower cam edge 56 of all the inactive ones of said pawls. Thus magnet 49 is never called upon to operate against more than any single one of the springs 26 when operating universal frame 54, thereby requiring only minimum size and power for said magnet.

Figures 17A, 18:
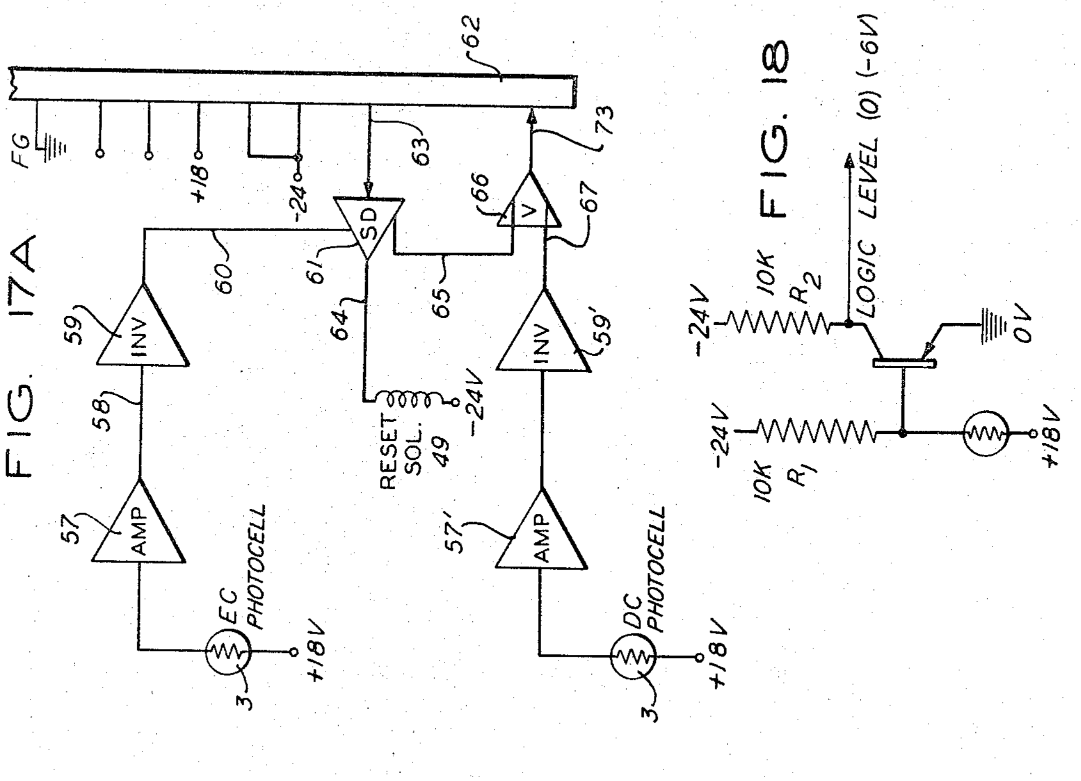
FIGS. 17–17A illustrate an applicable circuit diagram relative to the photoelectric keyboard of the invention.
FIG. 18 is a circuit diagram illustrating the arrangement for each of the photocells associated with the coding light beams.
Figure 17:
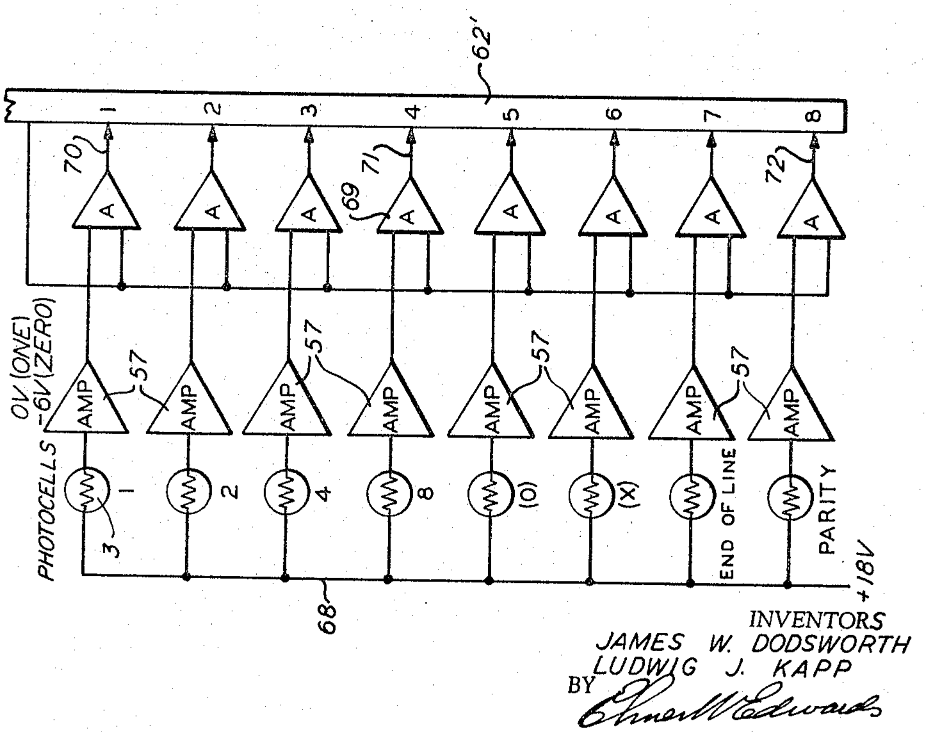

To further facilitate an understanding of the invention the mode of operation thereof will now be described in relation to a selection of the digit value "9" key, with particular reference being made to the wiring diagrams (FIGS. 17, 17A, and 18).

Figures 9, 10, 11, 12:
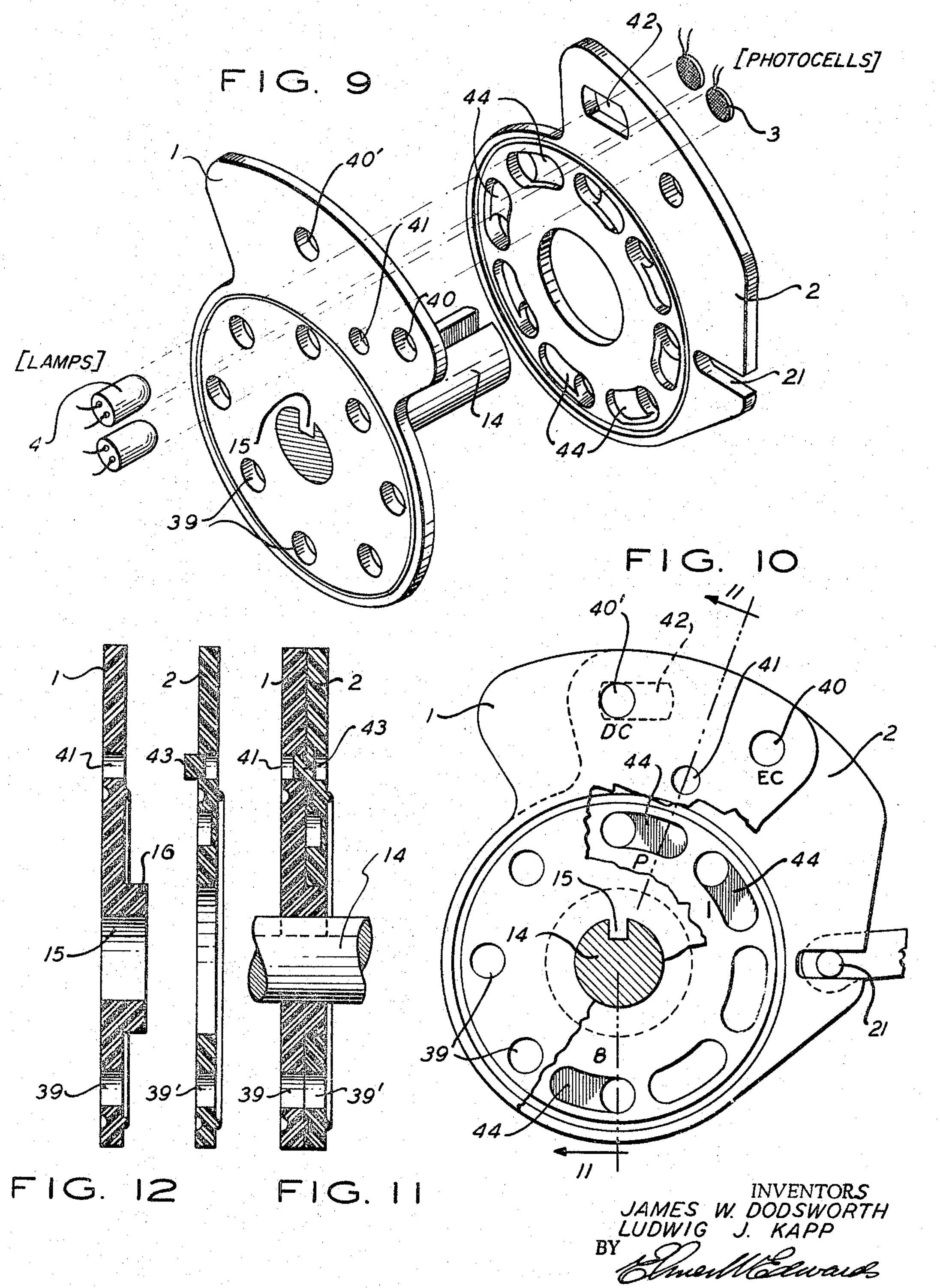
FIG. 9 is an enlarged perspective view of a pair of code permutation members adapted for control by a corresponding key of the keyboard.
FIG. 10 is an enlarged detail elevation showing a pair of the permutation discs in normal open condition for determining light beam transmission upon all of the associated photocells.
FIG. 11 is a cross section of a pair of the permutation discs as taken on line 11—11 of FIG. 10.
FIG. 12 is a view similar to FIG. 11 but showing the permutation discs as pulled apart for clarity of identification.
Figure 13:
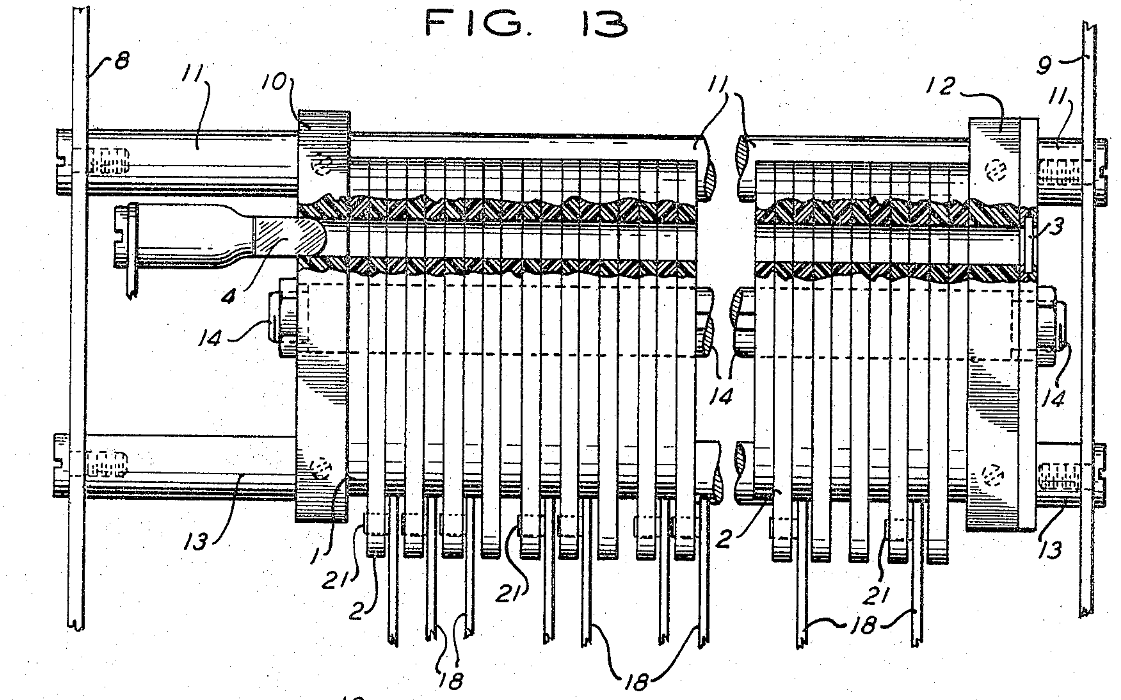
FIG. 13 is a top plan view of the photoelectric permutation unit.
Figure 14:
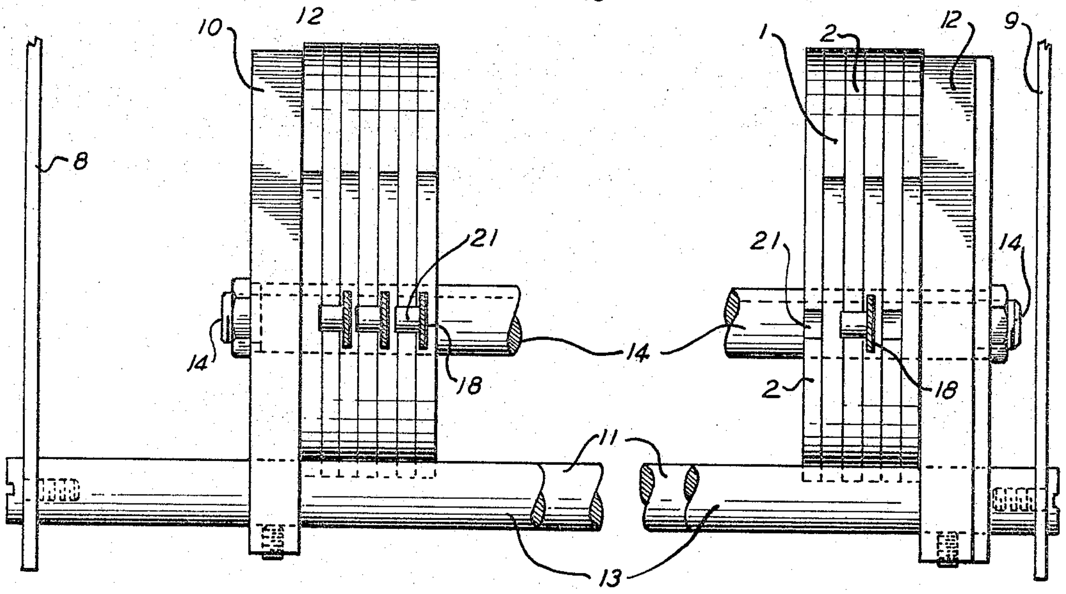
FIG. 14 is a front elevational view of the photoelectric permutation unit.

With respect to the digital value "9" key the appropriate disc 2 will have web portions 44 retained therein relative to the code digits for "1" and "8," as illustrated in FIG. 10, thereby maintaining the circular character of the corresponding openings. Since two code digits are involved in the instant example the usual parity check signal control is to be effected also and a web portion therefore is included for maintaining as circular the opening in said disc designated by the letter P. For all other such code representation however said disc will have the web portions 44 thereof punched out, whereby to form slotted openings relative thereto in lieu of circular configurations, as seen best in FIG. 9.

It is recalled that each of the fixed discs 1 include a series of orifices 39 for cooperation with the related orifices of the corresponding ones of the discs 2. Also that a pair of orifices 40, 40′ of each of the discs 1 are adapted for respective cooperation with a corresponding control orifice of the discs 2, indicated (FIG. 4) as EC or "early common" and with a slotted opening 42 of discs 2, indicated as DC or "delayed common."

In the preferred mode of operation it is intended that in the first portion of a movement of any disc 1 incident to an operation of its related key the orifice 40 related to the EC control shall always be masked prior to any other. Thereafter, in a continuing operation of the selected disc 2, one or more of the code orifices 39 will be masked simultaneaously in accordance with the particular arrangement of the web sections 44. Coincident with or immediately after the masking of code orifices 39 the disc 2 then acts to mask the orifice 40′ relating to the DC control, the above order of course being reversed upon a restoring of any disc 2 and its related key. Thus upon depression of the particular key for the digit value "9" the corresponding disc 2 will in order first shut off the light beam pertaining to the "early common" photocell designated EC (see also FIG. 5), next simultaneously the light beams for the 1, 8 and P photocells and thereafter the light beams for the "delayed common" photocell DC.

It may be stated at this time that the preferred logic level for the circuits now to be described with reference to the wiring diagrams FIGS. 17, 17A and 18 are construed to be 0 and −6 volts potential and that in keeping with usual practice for control in respect to the binary system any photocell under illumination identifies a "zero" and when extinguished will identify a "one." Also, all of the photocells are similar and of well-known type, each embodying circuitry such as that illustrated in FIG. 18, preferably connected to a source potential, say, +18 volts and also connected to the base of the transistor of an amplifier 57, there being an amplifier 57 for each photocell provided. Preferably the base of said transistor is connected also, through a suitable resistor, as $R_1$, FIG. 18, to a source of bias potential, say, −24 volts.

Thus upon an interruption of the light beam to the EC photocell the resistance thereof rises so that base voltage of related amplifier 57 thereupon goes negative (approximately −.1 to −.2). This turns on the transistor, which provides output from negative potential (−24 volts) through resistor $R_2$ to ground (0 volts) with the consequent raised output (0 volts) thereafter being extended by lead 58 to a suitable inverter 59. Output from said inverter thus goes low (−6 volts) and is extended by means of lead 60 to a suitable known type flip-flop control device 61. Said device is thereby conditioned for a future operation thereof incident to a subsequent feed-back pulse emanating over a lead 63 extending thereto from any slave or controlled equipment, being herein schematically identified by the bus bar 62. Flip-flop device 61 has one output connection by lead 64 to the reset solenoid 49, earlier described, and has also connection over a lead line 65 for normally extending a low potential voltage (−6 volts) therefrom to one input connection of a suitable OR gate 66. A second input connection for gate 66 is normally high (0 volts) and is controlled, through a suitable lead connection 67, inverter 59' and amplifier 57', by the "delayed common" photocell DC, in the manner and purpose as hereinafter described.

Following operation of the described control circuits incident to a masking of the EC photocell the masking disc 2 operated by digit value "9" key will immediately act to mask the particular openings 39 related to extinguishing the photocells controlling the 1, 8 and P code identification signals. Thus, as in well-known manner, control circuits are now effected from common lead 68 (FIG. 17) by said photocells, through related amplifiers 57, suitable AND gates 69 in the respective circuits and by corresponding leads 70, 71, 72 to appropriate terminals of the bus bar 62' for the receiving equipment.

Said equipment may of course be any of the well-known data processing instrumentalities and which include means adapted upon completion of any desired operation to so indicate such completion by the effecting of a suitable output feed-back signal, as in usual manner. In the instant case any such signal when subsequently emitted from output lead 63 (FIG. 17A) of bus bar 62 is extended through the above conditioned flip-flop means 61, and over lead 64 therefrom to effect thereby an energizing of the reset solenoid 49, whereby to restore the disc 2 and associated digit "9" key in the manner earlier described.

At the same time said feed-back signal also acts to turn on flip-flop means 61 from low potential to high potential over the lead 65 to the OR gate 66 for the purpose hereinafter described.

Meanwhile, however, following said masking of the 1, 8 and P photocells, continued operation of the disc 2 in the depression of the "9" value key acts now to mask the light beam for the DC photocell related to the "delayed common" control circuit, hereinafter described. Delayed common circuit control photocell DC, the corresponding amplifier 57' and inverter 59' are the same and function precisely in manner to that as described in respect to the circuit control from the EC photocell and it will be sufficient therefore to merely state that upon extinguishing photocell DC the normally high potential (0 volts) extended therefrom over lead connection 67 to the OR gate 66 now goes low (−6 volts).

From the above it will be observed therefore that with flip-flop 61 in normally "off" condition potential over lead 65 to OR gate 66 is low (−6 volts) and that upon extinguishing of photocell DC output from inverter 59' is now also low (−6 volts). Thus an output signal potential of −6 volts is caused to be extended over a lead 73 to the receiving equipment, identified by the bus bar 62, said signal being low determines that such receiving equipment may now act to read the characters in accordance with the keyboard set-up. After interrogating the control signals 1, 8 and P for the example herein described suitable means provided in the receiving equipment will thereupon act to feed back an impulse signal to that effect over lead 63 to the flip-flop means 61, earlier described. This signal will act to turn on the solenoid driver SD of flip-flop 61 thereby energizing the reset solenoid 49 for restoring disc 2 and associated digit "9" key in the manner as previously described. At the same time said signal will cause potential over lead 65 to OR gate 66 from the flip-flop 61 to now go from low (−6 volts) to high (0 volts). This will cause output from said gate to go high and effect a signal over lead 73 to the receiving equipment, indicating that said equipment shall not read the keyboard during such restoring operation and until the operated key is permitted to fully rise for normalizing the EC circuit. Also, upon said release of the operated key the associated disc 2 starts to return clockwise and will immediately unmask the DC light beam for illuminating the "delayed common" photocell, so that control therefrom to OR gate 66 also goes high and any subsequent key operation will again cause the DC circuit to go low, as in the manner heretofore described.

In the final return movement of disc 2 the EC photocell being again illuminated the control circuit of lead 60 to flip-flop 61 restores to high thereby restoring the solenoid driver SD and thus deenergizing the reset solenoid 49, while at the same time restoring low potential on lead 65 to OR gate 66.

Thus the circuits and associated parts are now all in their normal state for subsequent entry operations upon the keyboard.

While there has been shown and described the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

We claim:

1. In an apparatus of the class described having means to create a plurality of light beams and a related photocell controlled by each beam; the combination therewith of

- code permutation means including a fixed member having a plurality of windows aligned with corresponding ones of said photocells;
- a member adjustable relative to said fixed member and having at least one similar window normally aligned with any selected one of the first stated windows;
- said adjustable member having a plurality of elongated windows in overlapping alignment with corresponding ones of the first said windows in any positions of said adjustable member;
- means for displacing said adjustable member to a given position whereby opaque portions thereof contiguous with any of the said similar windows serve to mask selected ones of the first stated windows to thereby extinguish related ones of the photocells for determining coded character signal representations in accordance therewith, the said elongated windows permitting continuous light beams upon other photocells in association therewith;
- a fixed central support shaft for mounting related pairs of said permutation means in stacked array for transmitting light beams along predetermined paths, said shaft having a longitudinal keyway therein;
- a tooth on said fixed members engaging said keyway for holding said members against rotation;
- said fixed members having a plurality of said windows arranged in an arc concentric around said support shaft;
- a lateral hub on the fixed member serving as bearing support for the corresponding movable member and as seal against ambient crosslighting between associated pairs of said permutation members; and
- an embossed ring and a cooperating groove on each said permutation means encircling said plurality of windows to effect a seal against ambient crosslighting between said members.

2. In an apparatus of the class described having means to create a plurality of light beams and a related photocell controlled by each beam; the combination therewith of

- code permutation means including a fixed member having a plurality of windows aligned with corresponding ones of said photocells;
- a member adjustable relative to said fixed member and having at least one similar window normally aligned with any selected one of the first stated windows;
- said adjustable member having a plurality of elongated windows in overlapping alignment with corresponding ones of the first said windows in any positions of said adjustable member;

means for displacing said adjustable member to a given position whereby opaque portions thereof contiguous with any of the said similar windows serve to mask selected ones of the first stated windows to thereby extinguish related ones of the photocells for determining coded character signal representations in accordance therewith, the said elongated windows permitting continuous light beams upon other photocells in association therewith;

a stationary central support shaft mounting thereon in adjacent alternate manner said fixed and said movable permutation members in stacked array for transmitting separate light beams along simultaneously selected paths formed thereby, said shaft having a longitudinal keyway;

a key engageable therewith in mounting the permutation members upon said shaft, for preventing rotation of said fixed members;

said fixed members having a plurality of said windows arranged in a concentric circle around said support shaft and a pair of similar windows arranged in an arc of longer radius to the radius of said concentric circle;

said movable member having a plurality of windows arranged in a corresponding concentric circle for cooperation with the first stated windows;

and a pair of operation timing control windows on an arc of corresponding radius for cooperation with the said pair of similar windows, one of said control windows being circular of configuration and the other elongated; and wherein any selected one of said movable members when rotated around said support shaft acts in sequence first to mask the light beam relating to the said circular configuration of said operation timing control pair, next the light beams related to any selected ones of the said plurality of windows and subsequently the light beam related to the elongated opening cooperable with the other one of said operation timing control pair of similar windows.

3. The invention according to claim 2;

and wherein said permutation members are arranged in related pairs, one of said members for each pair being provided with a knockoff protrusion and the other member of said pairs including a receiving socket cooperable with said protrusion, whereby both discs of any selected pair may be locked against operation, while a removal of any said knockoff protrusions for other selected pairs permits operating one of said permutation members relative to the other member of said pairs.

4. For an apparatus of the class described having means to create a plurality of independent light beams and having related photocells controlled thereby; the combination of code permutation discs for interposing between the light beams and said photocells, one said permutation disc fixed and having a plurality of spaced windows therein;

a permutation disc adjacent the first said permutation disc and adjustable relative thereto, said disc having a plurality of spaced windows therein each coincident with a corresponding one of the windows in the first said disc;

opaque knockout portions in one of said discs, removable for elongating selective ones of said windows whereby to maintain continuous light beams upon related ones of said photocells in any adjusted position of one disc relative to the other disc, the opaque portions remaining serving to extinguish selected ones of said photocells upon the displacement of said adjustable disc;

said fixed disc including a central orifice and a key lug extending therein;

a hub extending laterally from said disc for mounting the movable disc thereon;

the said windows arranged in a concentric manner around said central orifice;

a groove in one of said discs encircling the plurality of windows therein; and a matching protruding ring on the other of said discs for engagement with said groove to minimize ambient crosslighting.

5. The invention according to claim 4; and a pair of spaced orifices on one of said discs arranged on an arc concentric to said central orifice and of greater radius thereto to that of the radius thereto for the said plurality of windows;

a corresponding orifice in the other of said discs normally aligned with one orifice only of said pair;

an elongated opening extending over the other orifice only of said pair; and wherein adjustment of one disc relative to the other will mask one of said orifices prior to a masking of any said windows and will mask the other orifice of said pair subsequent thereto.

6. The invention according to claim 5; and wherein one of said discs has a knockout protrusion for selective removal and the other said disc a cooperating receiving orifice, whereby to lock any selected pair of said discs against relative movement.

7. In an apparatus of the class described having means to create a plurality of independent light beams and having related photocells controlled thereby; the combination of code permutation devices including a fixed support shaft having a longitudinal keyway therein;

a permutation disc mountable upon said shaft and having a key thereon engageable with said keyway for locking said disc against rotation;

said disc having a plurality of spaced perforations therein arranged in a circular manner concentrically about said shaft;

a permutation disc mountable adjacent the first said permutation disc for a pivotal movement around said shaft;

the latter said disc having a plurality of spaced perforations coincident with corresponding ones of the spaced spaced perforations in the first said disc; and opaque knockout portions in one of the said discs adapted upon removal for elongating selective ones of said perforations whereby to maintain continuous light beams upon related ones of said photocells in any adjusted position of one disc relative to an adjacent disc, the opaque portions remaining serving to extinguish selected ones of said photocells upon displacement of a disc to a given position.

8. In an apparatus of the class described having means to create a plurality of independent light beams and having related photocells under control thereof; the combination of code permutation devices including a fixed support shaft;

a first member mountable thereon and secured against rotation;

said member having a plurality of windows therein arranged in a uniform concentric circle about said shaft;

a second member mountable adjacent said first member for pivotal operation around said shaft;

said second member having a plurality of corresponding windows for alignment with the windows in said first member; and a reduced thickness wall forming an opaque knockout section contiguous with each of the said windows in said second member;

said knockout sections selectively removable for elongating the related windows along as arc concentric with said shaft, whereby to maintain light beams upon corresponding ones of the said photocells during operations of said second disc while any remaining ones of said opaque sections act upon an operation of said disc to a given position to extinguish related photocells selected in accordance therewith.

9. In an apparatus of the class described the combination comprising a keyboard having an assembly of character key levers;

a coding unit including a plurality of photocells and lamp means to create independent light beams thereon;

a plurality of adjacently stacked pairs of code permutation members interposed between said lamps and said photocells, one member of each pair fixed and the other one movable;

said fixed members having a plurality of windows aligned with corresponding ones of said photocells, said movable members having at least one similar window and a plurality of elongated windows aligned with the first said windows for passing the light beams to corresponding ones of said photocells;

a power shaft having selective power operating means thereon individual to each of said movable members;

control means including a plurality of latching means for coupling any selected ones of said power operating means with a related one of said movable members in accordance with a key selection, said power operating means thereupon uniformly displacing only the corresponding movable member to a given position whereby opaque areas thereof contiguous to any said windows therein serve to mask selected ones of the corresponding windows in the fixed member to thereby extinguish the related photocells for determining coded character representations in accordance with the key selection, while said elongated windows permit continuous light beams to remain upon other ones of said photocells.

10. The invention according to claim 9; and wherein the selective individual power operating means for said movable members each include a ratchet toothed wheel mounted for rotation around said power shaft;

friction drive means therefor, mounted between said shaft and said ratchet toothed wheel;

a fixed stop limiting operation of any said movable members to said given position;

and wherein the individual power operating means in a continuing operation of said shaft acts to maintain operating pressure for holding any operated ones of said movable members at said given position and against operating rebound of the parts.

11. The invention according to claim 10; said friction drive means including individual springs each connected to a corresponding one of said ratchet wheels and being wound upon said power shaft in a manner providing for frictional drive therewith; and in which said springs serve as bearing support for the respective one of said ratchet wheels.

12. The invention according to claim 10; including means controlled in accordance with said selectively extinguished photocells;

a control pair of windows on each of the stacked pairs of code permutation members;

a photocell and light source related to each of said windows comprising said pair;

and wherein during an operation of a permutation member one of said windows is caused to be masked for controlling the related photocell prior to all others, while the other window comprising said pair is later masked for controlling its related photocell subsequent to all others.

13. The invention according to claim 12; wherein the latching means are latching pawls and in which a universal restoring member operable for releasing any active one of the latching pawls from the related power means without causing displacement of any inactive ones of the said latching pawls.

14. The invention according to claim 13; including electromagnetic means for operating said restoring member; and control circuit means therefor including a flip-flop element conditioned upon the extinguishing of the said first masked photocell for a subsequent operation in energizing said electromagnetic means by a subsequent impulse emanating with a completion of an operation of the means controlled by the selectively extinguished character determining photocells.

15. In an apparatus of the class described the combination comprising a keyboard having an assembly of character key levers;

a coding unit including a plurality of adjacently stacked pairs of code permutation members, one member of said pairs being fixed and the other movable;

lamps to create a plurality of light beams;

photocells each controlled by related ones of said light beams;

the stacked fixed members having windows therein aligned for passing light beams between said lamps and said photocells;

light masking shutters comprising sections on said movable members and displaceable therewith for masking simultaneously selective ones of said photocells;

a power shaft having a plurality of individual power operating means thereon;

means for selectively connecting any said individual power operating means with a related one of the movable members in accordance with an initial operation of a corresponding one of said key levers, said power means thereupon adjusting the selected member to masking position and thereby extinguish related photocells for transmitting coded character representations in accordance therewith; and means for receiving said coded character representations.

16. The invention according to claim 15 and including a control window on each of said fixed members;

an opaque portion of the movable members adapted upon said adjustment thereof to mask said window for extinguishing a related photocell subsequent to an extinguishing of the character photocells;

control circuit means including an OR gate having output connection to said receiving means;

flip-flop means normally providing a given potential upon one connection to said OR gate;

said photocell normally providing upon a second input to said OR gate a potential differing from the first said given potential;

said potentials as combined providing an output from said OR gate dictating to said receiving means for a "nonreception" of said character representation signals; and said extinguishing of said control photocell modifying the second said input potential to that of the first said input potential for said OR gate whereby output thereof is modified to signal the receiving means to accept character representation signals.

17. The invention according to claim 16; and wherein following reception of said character representation signals a feedback impulse initiated from said receiving means serves to operate said flip-flop for modifying the potential therefrom upon said OR gate thereby restoring output signal thereof to the nonaccept condition; and said movable member immediately in a subsequent restoral thereof reilluminates said control photocell to restore original potential therefrom to said OR gate, the said nonaccept signal remaining on the output thereof.

18. The invention according to claim 17; and a second control window on each said fixed member;

an opaque portion on the movable members cooperable in an operation thereof to mask said control window and extinguish the related photocell prior to all others;

said control window thereafter in return operations being unmasked to reilluminate its related photocell subsequent to all others;

and wherein said reillumination occurring following an operation of the flip-flop by said feedback impulse will restore to said flip-flop an original given potential.

19. The invention according to claim 15; and each said fixed member having a pair of control windows therein;

each said movable member having a pair of windows cooperable therewith, one of similar configuration in alignment with a first one of said control windows and the other of elongated configuration having overlapping alignment with the other of said control windows;

photocells related to each of said control windows;

one window of the control pair in an operation of the movable member being masked for extinguishing the related photocell prior to all others;

the other window of said control pair being thereafter masked for extinguishing its related photocell subsequent to all others;

universal restore means for the means connecting the individual power operating means to selected ones of the movable members;

electromagnetic operating means for said restore means;

a control circuit therefor including a flip-flop with one input of given potential under control of the first said control photocell;

another input thereto under control of an impulse emanating from the means receiving said character representations;

said extinguishing of the first said control photocell serving to raise potential therefrom to effect a conditioning of said flip-flop;

a normal output of given potential from said flip-flop;

an OR gate including a connection therewith for receiving said potential, said OR gate having circuit connection for receiving also a given potential from the second said control photocell, the latter said potential normally higher than the first said potential;

and in which said subsequent extinguishing of said latter photocell lowers potential upon said OR gate, thereupon signaling the receiving means to accept character representation signals;

said receiving means incident thereto pulsing the conditioned flip-flop to cause an operation of said electromagnetic means for releasing the power operating means from the selected permutation member for the restoral of said member;

and wherein said pulsing of the flip-flop serves also to raise the potential therefrom upon said OR gate to prevent thereby any subsequent character signal readings by said receiving means;

and wherein a subsequent reillumination of the first said control photocell in a restore operation of the selected permutation member acts to normalize the flip-flop and thereby also the input from said flip-flop to the said OR gate.

References Cited

UNITED STATES PATENTS

| | | | |
|---|---|---|---|
| 2,519,688 | 8/1950 | Mitchell | 250—219 |
| 2,541,247 | 2/1951 | Herr | 250—219 |
| 2,605,965 | 8/1952 | Shepherd | 250—219 |
| 2,807,728 | 9/1957 | Kilburn et al. | 250—219 |
| 3,077,971 | 2/1963 | Palmer | 197—16 |

RALPH G. NILSON, *Primary Examiner.*

J. D. WALL, *Assistant Examiner.*